US012709087B2

(12) United States Patent
Rapenne et al.

(10) Patent No.: US 12,709,087 B2
(45) Date of Patent: Aug. 18, 2026

(54) SLIDING LAMINATED GLAZED UNIT WITH INTERIOR OFFSET AND METHOD FOR MANUFACTURING SAID GLAZED UNIT

(71) Applicant: SAINT-GOBAIN GLASS FRANCE, Courbevoie (FR)

(72) Inventors: Thibault Rapenne, Noyon (FR); Simon Le Moal, Pantin (FR); Jérôme Pelletier, Cuignieres (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 384 days.

(21) Appl. No.: 18/263,086

(22) PCT Filed: Jan. 26, 2022

(86) PCT No.: PCT/FR2022/050140

§ 371 (c)(1),
(2) Date: Jul. 26, 2023

(87) PCT Pub. No.: WO2022/162309

PCT Pub. Date: Aug. 4, 2022

(65) Prior Publication Data

US 2024/0092063 A1 Mar. 21, 2024

(30) Foreign Application Priority Data

Jan. 27, 2021 (FR) ...................................... 2100742

(51) Int. Cl.

| | |
|---|---|
| ***B32B 17/10*** | (2006.01) |
| ***B32B 1/00*** | (2024.01) |
| ***B60J 1/17*** | (2006.01) |

(52) U.S. Cl.
CPC .......... *B32B 17/10036* (2013.01); *B32B 1/00* (2013.01); *B32B 17/10293* (2013.01); *B60J 1/17* (2013.01); *B32B 2307/7376* (2023.05)

(58) Field of Classification Search
None
See application file for complete search history.

(56) References Cited

U.S. PATENT DOCUMENTS

2017/0036414 A1* 2/2017 Notsu ...................... B60J 1/008

FOREIGN PATENT DOCUMENTS

| | | |
|---|---|---|
| CA | 3 040 590 A1 | 5/2018 |
| EP | 0 418 123 A1 | 3/1991 |

(Continued)

OTHER PUBLICATIONS

International Search Report as issued in International Patent Application No. PCT/FR2022/050140, dated May 30, 2022.

*Primary Examiner* — David Sample
(74) *Attorney, Agent, or Firm* — CUSHMAN PARTNERS, LLC

(57) ABSTRACT

A vehicle glazed unit includes a glass pane and a system to allow mobility of the glass pane in vertical translation relative to a door of the vehicle, the glass pane being curved and laminated and including an exterior glass sheet, an interior glass sheet and an adhesive material between the interior and exterior glass sheets. The edge of the interior glass sheet and the edge of the adhesive material sheet are both in a lateral projection of the edge of the exterior glass sheet in at least one hidden alignment zone which is located in the hidden part of the glass, and the interior offset has a width between 0.8 mm and 5.0 mm and is present in an entirety of the visible part of the glass pane.

16 Claims, 2 Drawing Sheets

(56) References Cited

FOREIGN PATENT DOCUMENTS

| | | | |
|---|---|---|---|
| EP | 3 395 777 | A1 | 10/2018 |
| FR | 2 000 890 | A1 | 9/1969 |
| WO | WO 2013/044473 | A1 | 1/2013 |
| WO | WO 2014/029605 | A1 | 2/2014 |
| WO | WO 2020/044061 | A1 | 3/2020 |

* cited by examiner

[Fig. 1]
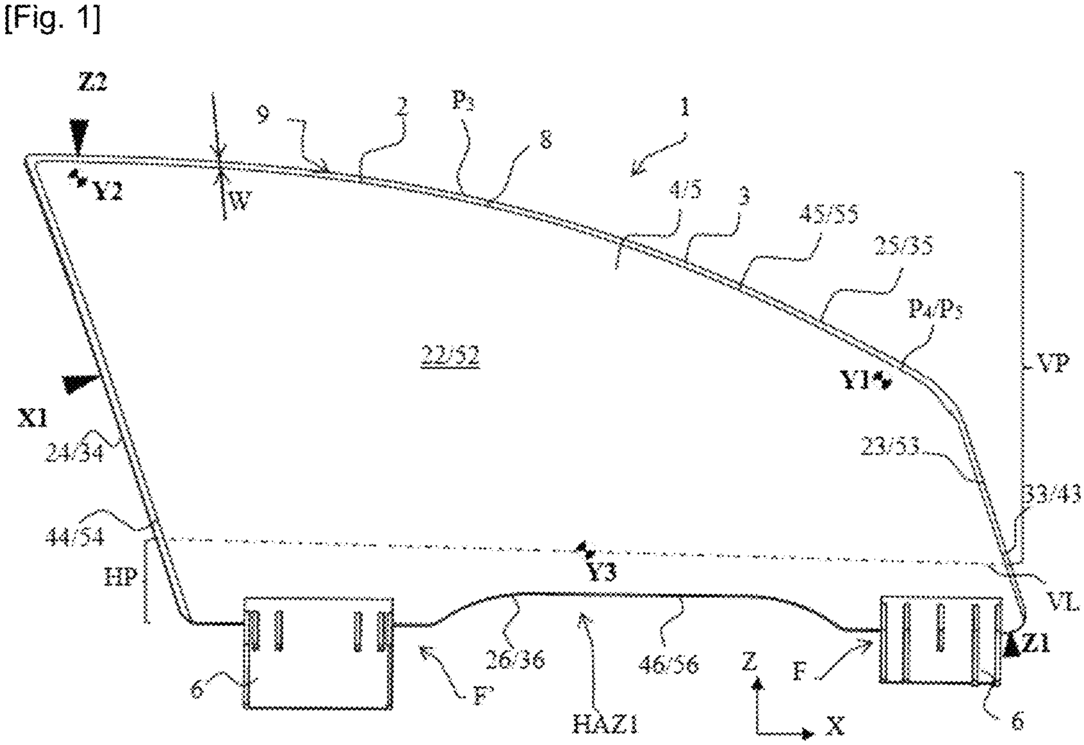
[Fig. 2]
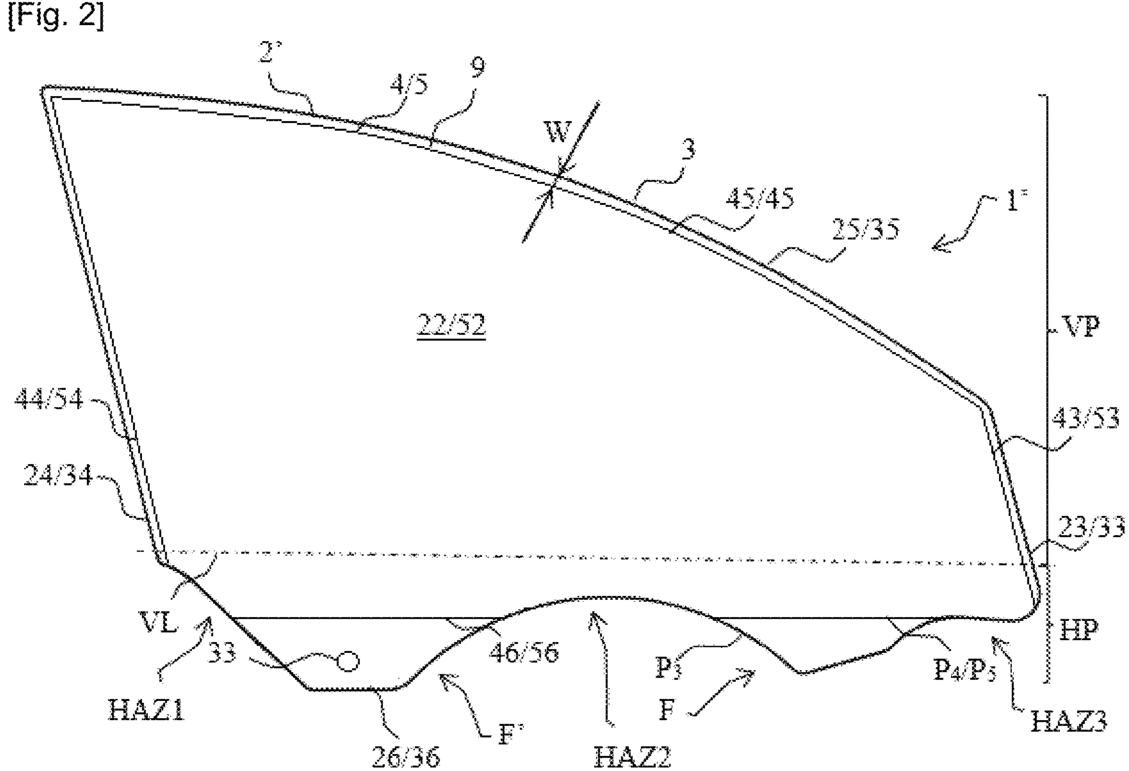

[Fig. 3]
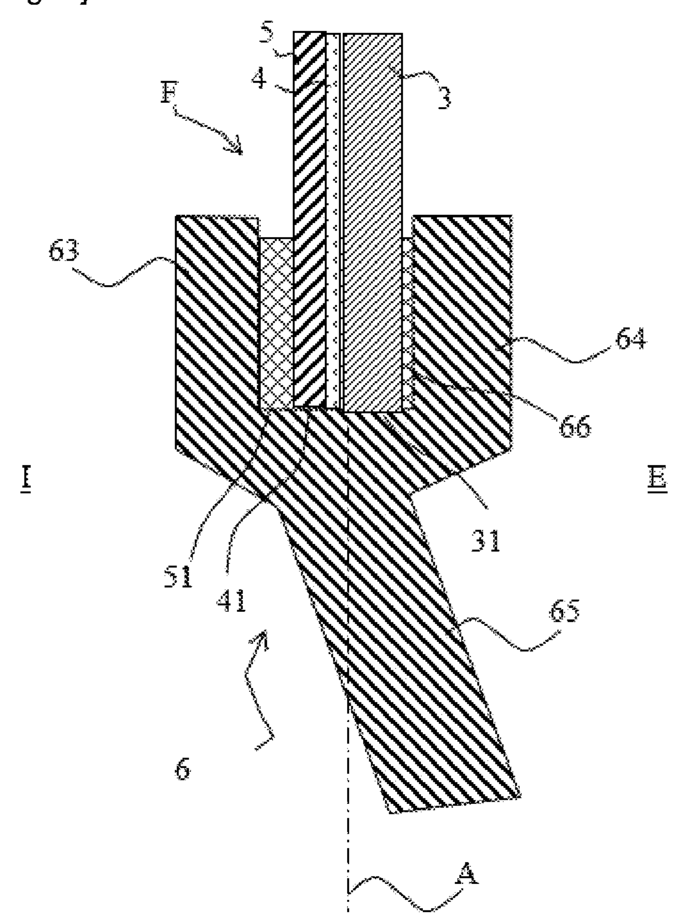
[Fig. 4]
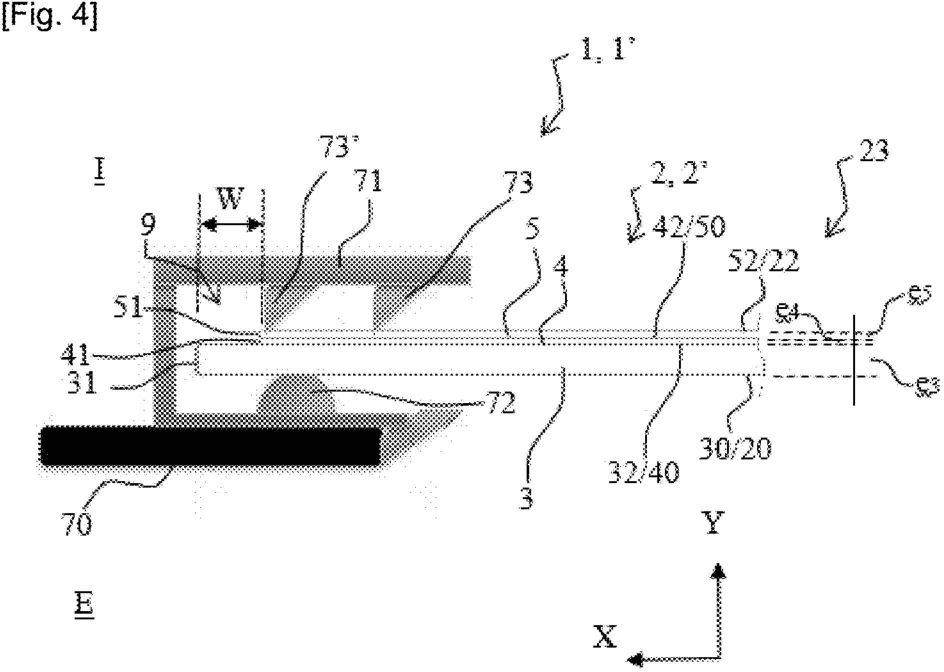

SLIDING LAMINATED GLAZED UNIT WITH INTERIOR OFFSET AND METHOD FOR MANUFACTURING SAID GLAZED UNIT

CROSS-REFERENCE TO RELATED APPLICATIONS

This application is the U.S. National Stage of PCT/FR2022/050140, filed Jan. 26, 2022, which in turn claims priority to French patent application number 2100742 filed Jan. 27, 2021. The content of these applications are incorporated herein by reference in their entireties.

The present invention relates to a vehicle glazed unit, particularly for a motor vehicle, comprising a glass pane as well as means for allowing the movement of said glass pane in vertical translation with respect to a door of said vehicle, said glass pane being curved and laminated and comprising at least an exterior glass sheet, an interior glass sheet, as well as an adhesive material sheet located between said exterior glass sheet and said interior glass sheet, each sheet having a peripheral edge and a thickness.

International patent application No. WO 2013/04473 teaches that it is possible to perform what has become known as cold-bending of a curved laminated glass pane using, for the laminating operation, a curved thick glass sheet, an adhesive material sheet and a thin glass sheet that is initially flat or slightly curved, the thickness of which is not greater than one third the thickness of the curved thick glass sheet.

International patent application No. WO 2014/029605 discloses that a glass pane generally has a line of sight creating, when the glazed unit is considered vertically, a separation between, on the one hand, a hidden part of the glass pane that is located under said line of sight and that is intended to be hidden inside said door regardless of the position of said glass pane with respect to said door and, on the other hand, a visible part of the glass pane that is located above said line of sight, and teaches that it is important that the edges of the three sheets of the laminated glass pane be laterally aligned with one another in the visible part of the glass pane but that the hidden part can contain a zone where only the thick exterior glass sheet is present, the securing of the glazed unit being carried out in this zone.

The prior art further knows, from patent application EP 3395777, a movable laminated glazed unit such that the edge of the interior glass sheet and the edge of the adhesive material sheet of the glass pane are located below the edge of the exterior glass sheet so as to form an interior offset having a very reduced specific width in the order of 1 mm and preferably even less.

In practice, the assembly of the three sheets to form the laminated glass pane can be particularly complicated when the configuration of the finished laminated glass pane is complex. Indeed, for complex curvatures, it is difficult to get the thin interior glass sheet to follow the curve of the thick exterior glass sheet perfectly over its entire surface area and at the same time to get the perimeter of the thin interior glass sheet to follow the perimeter of the thick exterior glass sheet perfectly.

During the lamination operation, which is generally carried out in an autoclave, it sometimes happens that, for some glass panes of a batch, the perimeter of the thin interior glass sheet is offset in the centripetal direction or in the centrifugal direction in a corner, or a zone, or sometimes even several zones, of the perimeter of the thick exterior glass sheet. These types of glass panes do not have a periphery having a homogeneous appearance and must be discarded, as they are rejected by the motor vehicle manufacturer.

This local misalignment of the edges may also cause weak zones of the laminated glass pane.

One aim of the present invention is therefore to propose a movable laminated glazed unit arrangement that can both be manufactured correctly and rapidly and that has an acceptable aesthetic configuration, in particular a periphery having a homogeneous appearance in the visible part of the glass pane.

The invention is based on the discovery that rather than locally undergoing an offset or overhang of the interior glass sheet, it was preferable to design it and to implement it by lamination such that, after the lamination, the laminated glass pane intentionally has an interior, reduced, visible, but homogeneous offset in the visible part of the glass pane.

However, if such an interior offset was completely peripheral, it would complicate the positioning of the sheets relative to one another before the lamination and would risk degrading the reliability of the lamination operation, thus, the invention is further based on providing at least one zone in which this offset is absent, and providing that this zone is in the hidden part of the glass pane, the zone that always remains hidden inside the jamb of the door, regardless of the position of the glass pane (open or closed) relative to the door.

Furthermore, the zone in which this offset is absent is a weak zone of the laminated glass pane, but by providing that the offset is absent specifically in a hidden zone of the glass pane, this weak zone is permanently protected inside the jamb of the door, regardless of the position of the glazed unit (open or closed) relative to the door.

The present invention thus relates, in its broadest sense, to a vehicle glazed unit according to claim 1. This glazed unit includes a glass pane as well as means for allowing the mobility of said glass pane in vertical translation relative to a door of said vehicle, said glass pane being curved and laminated and comprising at least an exterior glass sheet, an interior glass sheet, as well as an adhesive material sheet located between said exterior glass sheet and said interior glass sheet, each sheet having a peripheral edge, the edge of said interior glass sheet and the edge of said adhesive material sheet being located below the edge of said exterior glass sheet so as to form an interior offset having a width, said glass pane having a line of sight creating, when the glazed unit is considered vertically, a separation between, on the one hand, a hidden part of the glass pane that is located below said line of sight and that is intended to be hidden inside said door regardless of the position of said glass pane relative to said door and, on the other hand, a visible part of the glass pane that is located above said line of sight, said glazed unit being remarkable in that:

- the edge of said interior glass sheet and the edge of said adhesive material sheet are both in the lateral projection of the edge of said exterior glass sheet in at least one hidden alignment zone, or even in several hidden alignment zones, which is, or are each, located in said hidden part of the glass, and
- said interior offset has a width between 0.8 mm and 5.0 mm, and preferably between 1.0 mm and 4.0 mm, or even between 1.2 mm and 3.8 mm, and is present in the entirety of said visible part of the glass pane.

The offset is called "interior offset" because it involves making the interior glass sheet smaller than the exterior glass sheet; in other words, only the exterior glass sheet is entirely at the nominal dimensions (dimensions of the bay to be closed).

The width of the interior offset is the distance between a plane normal to the rim of the exterior glass sheet and a plane normal to the rim of the interior glass sheet.

To facilitate the implementation of the lamination, it is preferable for the interior offset of the interior glass sheet to be applied in a manner identical to the adhesive material sheet located between the two glass sheets.

Said means for allowing the mobility of said glass pane may comprise, within the meaning of the present invention, one or several holes passing partially or completely through said glass pane (that is, over a part of the thickness of a component element thereof or the totality of the thickness of this element or over a part of the thickness of the glass pane comprising several elements in this location, or even over the entirety of the thickness of the glass pane), one or several holders, one or several rails, or runners.

Said interior offset further extends, preferably, in said hidden part of the glass pane, over a height of at least 5.0 mm, and preferably over a height of at least 10.0 mm, under said line of sight, in order to ensure that the offset has a homogeneous appearance even slightly beyond the zone where it is visible.

Said interior offset is preferably present along the entirety of a first lateral rim, a top rim and a second lateral rim of the glass pane.

Said interior offset has a width that is preferably constant along the visible part of a first lateral rim of the glass pane and/or along the visible part of an upper rim of the glass pane and/or along the visible part of a second lateral rim of the glass pane, and preferably said interior offset has a constant width along the entirety of its length in said visible part of the glass pane.

Said interior offset is intended to be guided in a guiding and sealing element secured to said vehicle.

Said exterior glass sheet and said interior glass sheet are preferably such that the thickness of said interior glass sheet is less than the thickness of said exterior glass sheet.

In one variant, the edge of said interior glass sheet is located below the edge of said exterior glass sheet:

- over at least part, or even all, of the length of said first lateral rim, and/or
- over at least part, or even all, of the length of said second lateral rim of said glass pane, and/or
- over at least part, or even all, of the length of said upper rim of the glass pane,
- without being located below the edge of said exterior glass sheet over at least part, or even all, of the length of said bottom rim of the glass pane.

Thus, the glass pane is easier to manufacture because the one (or more) part(s) of the edge of said interior glass sheet that does(do) not extend beyond the edge of said adhesive material sheet and the edge of said exterior glass sheet may be such that the edge of said interior glass sheet is then aligned with the edge of the adhesive material sheet and with the edge of the exterior glass sheet; this(these) part(s) may then serve as reference zone(s) for the positioning of the interior glass sheet and the adhesive material sheet with respect to the curved interior glass sheet during the manufacture of the glass pane (that is to say, during lamination).

In one variant, said hidden alignment zone consists of one piece all along a bottom rim of said glass pane. Thus, the entire bottom rim of the interior glass sheet can serve as a reference for one (or several) reference stop(s) for the positioning of the interior glass sheet and of the adhesive material sheet prior to the lamination. In particular, with three reference zones in the hidden alignment zone, the referencing of the alignment is particularly reliable.

In another variant, a bottom rim of said glass pane includes three hidden alignment zones and two non-laminated securing zones, each non-laminated securing zone being interposed between two successive hidden alignment zones. Thus, three hidden alignment zones can serve as a reference for reference stops for positioning the interior glass sheet and the adhesive material sheet prior to the lamination. Thus, the glass pane can be secured by virtue of the securing zones in which only the exterior glass sheet is present; which simplifies the securing. Furthermore, with three hidden alignment zones, the referencing of the alignment is particularly reliable.

The glass pane is a laminated glass pane in the sense that there is no gas-filled space or vacuum space between the sheets that constitute the glass pane.

Advantageously, the thickness of said exterior glass sheet is between 2.85 mm and 4.85 mm.

Advantageously, the thickness of said interior glass sheet is between 0.30 mm and 2.60 mm.

In a preferred embodiment of the present invention, the thickness of said interior glass sheet is between 1.00 mm and 1.20 mm.

Advantageously, said interior glass sheet has surface stresses at most of 20 MPa, 30 MPa and 40 MPa, respectively, for a thickness of said interior glass sheet of about 1.1 mm, about 1.6 mm and about 2.1 mm. The term "about" here refers to a value considered by the person skilled in the art as a standard value, even if locally this value can vary within a range of plus or minus 10%.

The present invention also relates to a method for manufacturing a vehicle glazed unit, said glazed unit including a glass pane as well as means for allowing the mobility of said glass pane in vertical translation relative to a door of said vehicle, said glass pane being curved and laminated and comprising at least an exterior glass sheet, an interior glass sheet, as well as an adhesive material sheet located between said exterior glass sheet and said interior glass sheet, each sheet having a peripheral edge, the edge of said interior glass sheet and the edge of said adhesive material sheet being located below the edge of said exterior glass sheet so as to form an interior offset having a width, said glass pane having a line of sight creating, when the glazed unit is considered vertically, a separation between, on the one hand, a hidden part of the glass pane that is located below said line of sight and that is intended to be concealed inside said door regardless of the position of said glass pane relative to said door and, on the other hand, a visible part of the glass pane that is located above said line of sight; said method being remarkable in that:

- for the operation of manufacturing said glass pane by lamination, the edge of said interior glass sheet and the edge of said adhesive material sheet are both positioned in the lateral projection of the edge of said exterior glass sheet in at least one hidden alignment zone, or even in several hidden alignment zones, which is, or are each, located in said hidden part of the glass pane, and the edge of said interior glass sheet and the edge of said adhesive material sheet are both positioned such that
- after lamination, said interior offset has a width of between 0.8 mm and 5.0 mm, and preferably between 1.0 mm and 4.0 mm, or even between 1.2 mm and 3.8 mm, and is present in the entirety of said visible part of the glass pane.

In the present document, for the mentioned ranges, the limits of the ranges are included in the ranges.

The expression "edge" or "end face" designates the narrow side of a sheet, which is located substantially transversely between the two main faces of a sheet. The "lateral projection" of an edge is considered in this transverse direction between the main faces of a sheet.

Thus, the glass pane is easier to manufacture because the one (or more) part(s) of the edge of said interior glass sheet and the edge of said adhesive material sheet does(do) not extend below the edge of said exterior glass sheet may be such that the edge of said interior glass sheet is then aligned with the edge of said adhesive material sheet and with the edge of said exterior glass sheet; this(these) part(s) may then serve as reference part(s) for the positioning of the interior glass sheet and the adhesive material sheet with respect to the exterior glass sheet during the manufacture of the glass pane (that is to say, during lamination).

Furthermore, this(these) one (or more) part(s) may be located facing means allowing the movement of said glass pane in translation with respect to the door of said vehicle (that is, the one or more glass pane holders) in order to increase the mechanical strength of the glass pane in this location.

The present invention has been developed for glazed units incorporated in doors having lateral jambs and an upper jamb at the glazed unit when the latter is raised (closed).

Especially advantageously, the present invention allows production of a glazed unit with a single interior overhang that will be visible by a user of the vehicle, but without it being truly noticed because it is discrete and preferably constant throughout the visible part of the glass pane.

The present invention will be better understood from reading the detailed description hereinafter of non-limiting exemplary embodiments and from the appended figures:

FIG. 1 shows an interior front view of a vehicle movable front glazed unit according to one embodiment of the invention with a partially peripheral interior offset and with glass pane holders;

FIG. 2 shows an interior front view of another vehicle movable front glazed unit according to another embodiment of the invention with a partially peripheral interior offset and without glass pane holders;

FIG. 3 shows a partial cross sectional view of a glass pane holder of FIG. 1; and FIG. 4 shows a partial cross sectional view of a lateral doorjamb with a glass pane according to the invention in the closed position.

It is noted that the proportions between the various elements depicted in the figures have not been strictly respected in order to facilitate the reading.

FIGS. 1 and 2 show a left lateral glazed unit 1, 1' of a vehicle, according to one embodiment of the invention, considered as being seen from the interior of this vehicle.

It is in particular a lateral glazed unit of a door of a motor vehicle (not visible in FIGS. 1 and 2) that can be moved in translation with respect to this door substantially according to the vertical between an open position wherein the glazed unit is located entirely or almost entirely in the interior of the door and a closed position wherein the glazed unit closes a glass pane opening of the door.

Thus, in a closed position, this glazed unit embodies a vertical separation between an interior space I that is in the interior of the vehicle and an exterior space E that is on the exterior of the vehicle.

The notions "exterior" and "interior" are therefore respectively considered in the present document with respect to this exterior space E and this interior space I.

As it concerns a lateral glazed unit, the latter for the most part extends according to the axis generally referred to as the "X-axis" of the vehicle, which is the central longitudinal axis of the advance of the vehicle equipped with the glazed unit according to the invention as a lateral glazed unit on the left side of the vehicle and which corresponds to the horizontal axis in the plane of the sheet in FIGS. 1 and 2.

In the context of the present document, the concepts of "centripetal" and "centrifugal" are to be considered in the plane of the sheet in FIG. 1 or 2, or in a general plane of the glazed unit when it is considered flat, to be expressed relative to the center of the glazed unit, according to the X and Y axes; the centripetal direction is in the direction of this center of the glazed unit whereas the centrifugal direction is away from this center.

The mobility of the glazed unit relative to the door is essentially vertical in the sense that this mobility takes place along the Z-axis, optionally with a small component along the transverse axis Y not shown in FIGS. 1 and 2.

In the embodiment of FIGS. 1 and 2, the glazed unit 1, 1' is in one piece.

In the exemplary embodiment shown, the glazed unit 1, 1' includes a glass pane 2, 2' that is curved (that is, not flat) and laminated. However, for more simplicity, it is considered in the figures that the glass pane 2, 2' is flat.

The glass pane 2, 2' of the glazed unit 1, 1' is a laminated glass pane that includes, from the exterior to the interior, at least, in this order: an exterior glass sheet 3, an adhesive interlayer 4 then an interior glass sheet 5; however, it is possible for at least one other sheet to be inserted between the exterior glass sheet 3 and the adhesive interlayer 4 or between the adhesive interlayer 4 and the interior glass sheet 5. The adhesive material interlayer sheet 4 and the exterior glass sheet 3 are seen by transparency through the interior glass sheet 5 in FIGS. 1 and 2. In a variant, the glass pane 2, 2' preferably consists of the exterior glass sheet 3, the adhesive interlayer 4 and the interior glass sheet 5, with no other sheet.

Furthermore, the glass pane 2, 2' has a first lateral rim 23, a second lateral rim 24, a top rim 25 and a bottom rim 26. The first lateral rim 23 and the second lateral rim 24 of the glass pane are arranged respectively in the part of the glass pane oriented toward the front and in the part of the glass pane oriented toward the rear of the vehicle. The top rim 25 and the bottom rim 26 of the glass pane are arranged in the part of the glass pane oriented toward the roof and in the part of the glass pane oriented toward the ground on which the vehicle rests.

The exterior glass sheet 3 has an exterior face 30 that is oriented toward the exterior space E, an interlayer face 32 that is oriented toward the adhesive interlayer 4, and a peripheral edge 31 that is located between these two faces. Furthermore, the exterior glass sheet 3 has a first lateral rim 33, a second lateral rim 34, a top rim 35 and a bottom rim 36. The first lateral rim 33 and the second lateral rim 34 of the exterior glass sheet 3 are arranged in the part of the exterior glass sheet 3 oriented toward the front and in the part of the exterior glass sheet 3 oriented toward the rear of the vehicle. The top rim 35 and the bottom rim 36 of the exterior glass sheet 3 are arranged in the part of the exterior glass sheet 3 that is oriented toward the roof and in the part of the exterior glass sheet 3 that is oriented toward the chassis of the vehicle.

The interior glass sheet 5 has an interlayer face 50 that is oriented toward the adhesive interlayer 4, an interior face 52 that is oriented toward the interior space I and a peripheral edge 51 that is located between these two faces. Furthermore, the interior glass sheet 5 has a first lateral rim 53, a second lateral rim 54, a top rim 55 and a bottom rim 56. The first lateral rim 53 and the second lateral rim 54 of the interior glass sheet 5 are arranged respectively in the part of the interior glass sheet 5 that is oriented toward the front and in the part of the interior glass sheet 5 that is oriented toward the rear of the vehicle. The top rim 55 and the bottom rim 56 of the interior glass sheet 5 are arranged respectively in the part of the interior glass sheet 5 that is oriented toward the roof and in the part of the interior glass sheet 5 that is oriented toward the chassis of the vehicle.

The adhesive interlayer 4 has an exterior interlayer face 40 that is oriented toward the interlayer face 32 and that herein makes contact with this interlayer face 32, an interior interlayer face 42 that is oriented toward the interlayer face 50 and that herein makes contact with this interlayer face 50, as well as a peripheral edge 41 that is located between these two interlayer faces 40, 42. Furthermore, the adhesive material interlayer sheet 4 has a first lateral rim 43, a second lateral rim 44, a top rim 45 and a bottom rim 46. The first lateral rim 43 and the second lateral rim 44 of the adhesive material interlayer sheet 4 are arranged respectively in the part of the adhesive interlayer sheet 4 that is oriented toward the front and in the part of the adhesive interlayer sheet 4 that is oriented toward the rear of the vehicle. The top rim 45 and the bottom rim 46 of the adhesive material interlayer sheet 4 are arranged in the part of the adhesive interlayer sheet 4 that is oriented toward the roof and in the part of the adhesive interlayer sheet 4 that is oriented toward the chassis of the vehicle.

The exterior glass sheet 3 is a glass sheet having undergone a hot-bending operation before the manufacture of the laminated glass pane 2, 2' having a thickness $e_3$ between 2.85 and 4.85 mm, for example 3.50 mm. The exterior glass sheet 3 may have surface stresses of at least 80 MPa while being less than 200 MPa.

The interior glass sheet 5 may be a glass sheet having undergone a thermal tempering or semi-tempering operation and having a thickness $e_5$ between 0.70 and 2.60 mm, or even between 0.70 and 2.50 mm, or even between 0.70 and 2.30 mm, or even between 0.70 and 2.10 mm, for example 1.10 mm or 1.60 mm. The tempering or semi-tempering operations have the advantage of being very rapid to perform. Indeed, on average, approximately 20 sheets of glass can be produced in one minute. Furthermore, the tempering or semi-tempering operation allows surface stresses to be introduced in the order of 20 MPa, 30 MPa and 40 MPa, respectively, on a glass sheet having a thickness of about 1.10 mm, about 1.60 mm and about 2.10 mm.

In a variant, the interior glass sheet 5 may be a glass sheet having undergone a chemical tempering operation and having a thickness $e_5$ between 0.30 and 1.60 mm, or even between 0.50 and 1.50 mm, or even between 0.70 and 1.20 mm, for example 1.10 mm. A chemical tempering operation allows surface stresses of at least 200 MPa to be introduced.

The adhesive interlayer 4 is for example a sheet made of polyvinyl butyral (PVB) having a thickness $e_4$ comprised between 0.30 and 1.50 mm, for example of 0.78 mm. This adhesive material sheet 4 preferably has the same length dimension according to the X-axis and height dimension according to the Z-axis as the interior glass sheet 5.

In the case where the glass pane 2, 2' includes one or several other sheets in addition to the three mentioned previously, the exterior glass sheet 3 is the outermost sheet of the laminated glass pane.

In a variant, the interior glass sheet 5 is not curved before the lamination of the laminated glass pane 2, 2'; it is this lamination that will give it its curved shape, following the shape of the exterior glass sheet 3. This is made possible by virtue of the small thickness of the interior glass sheet 5 relative to that of the exterior glass sheet 3.

In another variant, the interior glass sheet 5 is curved according to the final shape of the glass pane 2, 2' before the manufacture of the laminated glass pane 2.

In an intermediate variant, the interior glass sheet 5 is curved before the manufacture of the laminated glass pane 2, 2' according to a shape that is more flat than the shape it will ultimately have in the finished laminated glass pane 2, 2'.

FIGS. 1 and 2 show that the glass pane 2, 2' has an exterior face 20 that is embodied by the exterior face 30 of the exterior glass sheet 3, an interior face 22 that is embodied by the interior face 52 of the interior glass sheet 5 and a peripheral edge 21 located between these two faces, corresponding to the peripheral edge 31 of the exterior glass sheet 3, to the peripheral edge 41 of the adhesive material sheet 4 and to the peripheral edge 51 of the interior glass sheet 5.

In FIGS. 1 and 2, the dashed line, called "line of sight" or "limit of sight" VL, shows the top of the shell of the door inside which the glazed unit 1, 1' slides. When the glazed unit is considered vertically, this line of sight VL creates a separation between, on the one hand, a hidden part of the glass pane HP that is located below the line of sight VL and that is intended to be hidden inside the door regardless of the position of the glass pane relative to said door and, on the other hand, a visible part of the glass pane VP that is located above the line of sight VL.

In the hidden part of the glazed unit, below the line LV, the glazed unit 1, 1' has one and, here preferably two, securing zones F, F' in each of which a glass pane holder 6 is secured to the glass pane 2, 2' (only the glass pane holders of the glass pane of FIG. 1 are shown).

The glazed unit 1, 1' of FIGS. 1 and 2 thus includes, in addition to the glass pane 2, 2', along at least part of at least one bottom rim 26, at least one glass pane holder that is intended to accommodate a securing element, not shown, which has the purpose of allowing the glass pane holder to be attached in a movement system to raise and lower the glazed unit. On this subject, some documents talk of a "regulator" system.

The glazed unit 1, 1', in its use configuration, thus preferably includes two glass pane holders.

In the variant of FIG. 1, the means for allowing the movement of the glass pane 2 in translation relative to a door of the vehicle comprise at least one, and preferably at least two, glass pane holders 6, 6' for example having substantially an inverted h shape in a transverse cross-section.

FIG. 3 shows a detail view of such a glass pane holder 6 for a glass pane with an interior offset completely absent in the securing zone F. This glass pane holder 6 thus has

- a first part consisting of two parallel walls 63, 64 connected at their base and forming a longitudinal groove, that is to say, forming a U shape in cross section, and
- a second part consisting of a tail 65 extending opposite the parallel walls 63, 64 relative to the base connecting these walls.

In the longitudinal groove of the glass pane holder 6, 6', the edge 51 of the interior glass sheet and the edge 41 of said adhesive material sheet are both in the lateral projection of the edge 31 of said exterior glass sheet.

In the shown version, the assembly is performed so that said parallel walls 63, 64 of said h shape clasp the lower part of said glass pane 2, the tail 65 then being located substantially in the projection of the glass pane 2.

This h shape of the glass pane holder is particularly advantageous because it allows forces to be transmitted between the glass pane holder and the glass pane according to a large area corresponding to the sum of the interior surfaces of the parallel walls 63, 64; however, it is entirely possible to use a single plate, this plate having for example at least two parts: a first part for interacting with the glass pane and a second part for interacting with the driving mechanism (raising/lowering) of the glass pane.

In FIG. 3, the glass pane 2 is shown flat and the parallel walls 63, 64 and the tail 65 are planar but the glass pane 2 is curved and the parallel walls 63, 64 and/or the tail 65 can be curved. The tail 65 extends approximately from the midpoint of the base connecting the parallel walls 63, 64, but it is also possible to position the tail 65 in the projection of either one of the parallel walls 63, 64.

In FIG. 3, the tail 65 is not parallel to the walls 63, 64. The axis A illustrating the midplane of the glazed unit 1 at its lower end when the latter is correctly positioned with regard to the glass pane holder 6, the tail 65 is oriented at a non-zero angle with regard to the axis T, which angle is a function of the bending of the glass pane 2.

The tail 65 is intended to be connected to a motorized driving system, which is not shown, in order to allow the glazed unit 1 to be raised and lowered in the door of the vehicle.

The assembly of the glass pane holders 6, 6' and the laminated glass pane 2 is performed on a template allowing tolerances on the glass pane holder 6, 6'/glass pane 2 assembly to be controlled.

Before positioning and securing the glass pane holders, the glass pane 2 is first correctly positioned ("focused") in a mounting template having a plurality of positioning stops.

One of the positioning stops is designated as point Y3 and is preferably positioned on the line of sight VL illustrating the position of a low contact seal with the door when the glazed unit is closed.

The one (or more) glass pane holder(s) 6, 6' is(are) adhesively bonded with the aid of an adhesive, for example polyurethane, then "fitted" onto the glass pane 2, that is it is (they are) positioned so that the glass pane is present in the U shape, in abutment or not, by inserting between said parallel walls 63, 64 and the glass pane 2 an insert 66 made of plastic, such as for example of polypropylene.

In a variant, an in-situ injection of adhesive intended to form the insert 66 is proposed, which is made of thermoplastic hot-melt resin, for example based on polyamide.

The positioning of the insert 66 when the glass pane and the glass pane holders are correctly positioned with respect to one another thus guarantees the position of the glass pane holder, regardless of the contour of the glass pane.

The hot-melt resin used has an elastic limit of about 5.5 $N/mm^2$ and a breaking strength of 11 $N/mm^2$, calculated according to standard DIN 53455. It must be used at a temperature of about 220° C. and has at this temperature a viscosity in the order of 5000 mPa·s, measured according to standard ASTM D 3236.

The glass pane holders used are, preferably, made of aluminum alloy.

By way of example, with a 6060 aluminum alloy (AGS), a vertical compressive force of 30 to 50 tons is enough, that is correlated to the size of the glass pane holders, stresses of about 150 GPa for h-shaped glass pane holders of overall dimension of about 40×30 mm and of about 450 GPa for h-shaped glass pane holders of overall dimension of about 60×60 mm.

In the variant of FIG. 2, in the two securing zones F, F', the glass pane 2' is not laminated: the three elements constituting at least the lamination are not all present on the whole surface of the securing zone F, F', as detailed below.

Two securing methods are combined here:

at the front, the securing zone F has no hole and the glass pane holder therefore has no hole, and at the rear, the securing zone F' has a securing hole 33; the glass pane holder thus also has a securing hole.

Although this is not shown, it is quite possible for both of the securing zones F, F' of the glazed unit 1' of FIG. 2 to comprise a hole or for both of the securing zones F, F' of the glazed unit 1' not to comprise any holes.

In the version shown in FIG. 2, the bottom rim 56 of the interior glass sheet 5, as well as the bottom rim 46 of the adhesive material sheet 4, are much higher than the bottom rim 36 of the exterior glass sheet 3. The bottom rim 56 of the interior glass sheet 5 and the bottom rim 46 are located approximately midway along the vertical between the line of sight VL and the bottom rim 36 of the exterior glass sheet 3.

In the version shown in FIG. 2, in the securing zone F', the exterior sheet 3 includes a tubular hole 33, opening onto the two faces of the exterior sheet 3, the exterior face 30 and the interior face 32. This hole 33 has an axis and has a circular internal cross-section; it does not open onto the edge 31 of the exterior sheet 3: it is thoroughly circular in cross-section and is not a notch.

In the two securing zones F, F', the adhesive material sheet 4 and the interior glass sheet 5 are absent; only the exterior glass sheet 3 is present.

According to the invention, the edge 51 of the interior glass sheet 5 and the edge 41 of the adhesive material sheet 4 are located below the edge 31 of said exterior glass sheet 3 in order to form an interior offset 9 having a width W extending in the centripetal direction, and this interior offset is particular since it is not completely peripheral; it does not extend along the totality of the periphery of the glass pane: in at least one hidden alignment zone HAZ1, HAZ2, HAZ3, there is no interior offset and the edge 51 of said interior glass sheet 5 and the edge 41 of said adhesive material sheet 4 are both in the lateral projection of the edge 31 of the exterior glass sheet 3; this hidden alignment zone is located in the hidden part of the glass pane HP such that it remains permanently hidden inside the shell of the door, regardless of the position of the glazed unit with respect to this door (glazed unit open or closed or in an intermediate position between the two).

This interior offset 9 is unique in the visible part of the glass pane VP and has a relatively narrow width W of between 0.8 mm and 5.0 mm, and preferably between 1.0 mm and 4.0 mm, or even between 1.2 mm and 3.8 mm, and is present in the entirety of said visible part of the glass pane VP.

This interior offset 9 may not extend to the bottom of the first lateral rim 23 and/or of the second lateral rim 24, but it extends in the visible part of the glass pane, at least up to the line of sight VL and preferably extends, from this line of sight VL, in the hidden part of the glass pane HP, over a height of at least 5.0 mm, and preferably over a height of at least 10.0 mm, downward, below the line of sight VL. It is therefore possible to produce a hidden alignment zone in the bottom of the first lateral rim 23 and/or in the bottom of the second lateral rim 24, in particular to make it possible to carry out referencing along the X-axis alone.

In FIGS. 1 and 2, said interior offset 9 is present along the entirety of the first lateral rim 23, the entirety of the top rim 25 and the entirety of the second lateral rim 24 of the glass pane. The hidden alignment zone(s) is (are) therefore located along the bottom rim 26 of the glass pane 2 or at the corner between, on the one hand, the first lateral rim 23 and the bottom rim 26 and/or, on the other hand, the second lateral rim 24 and the bottom rim 26.

In the variant of FIG. 1, there is only one hidden alignment zone HAZ1 and it is formed all along the bottom rim 26 of the glass pane 2. This means that one (or several) positioning marks of the adhesive material sheet 4 and of the interior glass sheet 5 can be taken along the bottom rim 26 for the correct positioning of these sheets, along at least the Z-axis, before the lamination.

In the variant of FIG. 2, there are three hidden alignment zones HAZ1, HAZ2, HAZ3 that are distributed along the bottom rim 26 of the glass pane 2':

- a hidden alignment zone HAZ1 at the rear, near the corner between the first lateral rim 23 and the bottom rim 26,
- a hidden alignment zone HAZ3 at the front, near the corner between the second lateral rim 24 and the bottom rim 26, and
- a central hidden alignment zone HAZ2, located approximately at the middle of the bottom rim 26.

Thus, each non-laminated securing zone F, F' is interposed between two successive hidden alignment zones, respectively:

- between the hidden alignment zone HAZ2 and the hidden alignment zone HAZ3, and
- between the hidden alignment zone HAZ1 and the hidden alignment zone HAZ2.

The three hidden alignment zones HAZ1, HAZ2, HAZ3 in FIG. 2 each allow a positioning mark to be produced for the adhesive material sheet 4 and the interior glass sheet 5 relative to the exterior glass sheet 3 along at least the Z-axis, before the lamination.

Although this is not shown, it is possible to provide two hidden alignment zones and one or two securing zone(s), or to provide four hidden alignment zones.

The interior offset 9 has a width W that can be constant along the visible part of the first lateral rim 23 of the glass pane and/or along the visible part of the top rim 25 of the glass pane and/or along the visible part of the second lateral rim 24 of the glass pane; however, it is preferable for the interior offset 9 to have a constant width W along the entirety of its length in said visible part of the glass pane VP. It is not necessary for it to have the same width W in the hidden part of the glass pane HP if it is present in this hidden part of the glass pane HP.

The width W of the interior offset 9, measured on the finished laminated glass pane, is obtained with great precision by virtue of the fact that prior to the lamination:

- the exterior glass sheet is first correctly positioned ("focused") in a mounting template having a plurality of positioning stops, such as, for example, the stops X1, Y1, Y2, Z1, Z2 then
- the adhesive material sheet 4 and the interior glass sheet 5 are correctly positioned in the same mounting template using the same positioning stops.

At least one stop, here the stop Z1 in FIG. 1, is located in a hidden alignment zone.

Thus, in general, the entire part of the glazed unit that is located below the line of sight VL may not comprise an interior offset: in this part below the line of sight VL, inside the shell of the door when the glazed unit is closed, it is possible for the edge 31 of the exterior glass sheet 3 over one (or several) part(s) of its length, or even over the entirety of its length, to be aligned with the edge 51 of the interior glass sheet 5, or it is even possible for the edge 31 of the exterior glass sheet 3 over one (or several) part(s) of its length, or even over its entire length, to extend farther, in the centrifugal direction, than the edge 51 of the interior glass sheet 5.

It is for example possible for the edge 51 of the interior glass sheet 5 to be aligned with the edge 31 of the exterior glass sheet 3 only in the places where the means for allowing the movement of the glass pane 2 in translation with respect to a door of the vehicle are located.

In FIGS. 1 and 2, each of the edges 53, 54 and 55 of said interior glass sheet 5 is thus located, in a centripetal direction, below the edge 31 of said exterior glass sheet 3 (and the edge 41 of the adhesive material sheet 4) by forming a single interior offset 9, or centripetal shift.

Each sheet 3, 4, 5 has a peripheral perimeter $P_3$, $P_4$, $P_5$: the perimeter $P_5$ of the interior glass sheet 5 and the perimeter $P_4$ of the adhesive material sheet 4 extend below the perimeter $P_3$ of the exterior glass sheet 3 in the entirety of the visible part VP of the glass pane.

Above the limit of sight VL, the door of the vehicle may include at least one part with no jamb. Thus, it is possible for the door:

- not to include a front lateral jamb and for it to be the adjacent bodywork part, also called the "A-pillar," that guides the glazed unit, and/or
- not to include a rear lateral jamb and for it to be the adjacent bodywork part, also called the "B-pillar," that guides the glazed unit.

FIG. 4 shows the guidance of the rim of the glazed unit 1, 1' in a guiding and sealing element 71 secured to said vehicle.

More specifically, FIG. 4 shows a partial cross sectional view of the first rim 23 of the glass pane 2, 2' and shows one of the vertical guiding elements of the glazed unit 1, 1' that is secured to the front of the door. The guiding element includes, in particular, a first guiding and sealing element 71 allowing guiding, in translation along the Z-axis, of the glass pane 2, 2' and a first covering part 70 having the function of hiding the guiding and sealing element 71.

The first lateral rim 23 is in contact and slides between a spherical protuberance 72 and a seal comprising two lips 73, 73'. The seal 73 may comprise one lip or more than two lips.

Another guiding element (not visible) of the glazed unit 1, 1 is secured to the rear of the door, allowing guiding of the second lateral rim 24 of the glass pane 2, 2' in translation along the Z-axis.

In this FIG. 4, the interior glass sheet 5 is in contact with all the interior sealing elements of the guiding and sealing element 71. The interior offset 9 therefore has a substantial width without, however, this width requiring a specific interior seal to be provided.

The present invention is described in the preceding text by way of example. Of course, those skilled in the art are capable of implementing different variants of the invention without departing from the scope of the patent such as defined by the claims.

The invention claimed is:

1. A vehicle glazed unit comprising a glass pane and a system to allow mobility of said glass pane in vertical translation relative to a door of said vehicle, said glass pane being curved and laminated and comprising at least one exterior glass sheet, an interior glass sheet, as well as an adhesive material sheet located between said exterior glass sheet and said interior glass sheet, each interior and exterior glass sheet having a peripheral edge, the edge of said interior glass sheet and the edge of said adhesive material sheet being located below the edge of said exterior glass sheet so as to form an interior offset having a width, said glass pane having a line of sight creating, when the vehicle glazed unit is considered vertically, a separation between, on the one hand, a hidden part of the glass pane, which is located below said line of sight and which is intended to be hidden inside said door regardless of the position of said glass pane relative to said door and, on the other hand, a visible part of the glass pane, which is located above said line of sight, wherein:

the edge of said interior glass sheet and the edge of said adhesive material sheet are both in a lateral projection of the edge of said exterior glass sheet in at least one hidden alignment zone, or in several hidden alignment zones, which is, or are each, located in said hidden part of the glass, and said interior offset has a width between 0.8 mm and 5.0 mm and is present in an entirety of said visible part of the glass pane.

2. The vehicle glazed unit according to claim 1, wherein said interior offset extends, in said hidden part of the glass, over a height of at least 5.0 mm below said line of sight.

3. The vehicle glazed unit according to claim 1, wherein said interior offset is present along an entirety of a first lateral rim, a top rim and a second lateral rim of the glass pane.

4. The vehicle glazed unit according to claim 1, wherein said interior offset has a constant width along the visible part of a first lateral rim of the glass pane and/or along the visible part of an upper rim of the glass pane and/or along the visible part of a second lateral rim of the glass pane.

5. The vehicle glazed unit according to claim 1, wherein said interior glass sheet has surface stresses of at most 20 MPa, 30 MPa and 40 MPa, respectively, for a thickness of said exterior glass sheet of about 1.1 mm, about 1.6 mm and about 2.1 mm.

6. The vehicle glazed unit according to claim 1, wherein said interior glass sheet has a minimum surface stress of 200 MPa.

7. The vehicle glazed unit according to claim 1, wherein said hidden alignment zone consists of one piece all along a bottom rim of said glass pane.

8. The vehicle glazed unit according to claim 1, wherein a bottom rim of said glass pane includes three hidden alignment zones and two non-laminated securing zones, each non-laminated securing zone being interposed between two successive hidden securing zones.

9. The vehicle glazed unit according to claim 1, wherein said interior offset is intended to be guided in a guiding and sealing element secured to said vehicle.

10. A method for manufacturing a vehicle glazed unit according to claim 1, said vehicle glazed unit a glass pane and a system to allow mobility of said glass pane in vertical translation relative to a door of said vehicle, said glass pane being curved and laminated and comprising at least an exterior glass sheet, an interior glass sheet, as well as an adhesive material sheet located between said exterior glass sheet and said interior glass sheet, each exterior and interior sheet having a peripheral edge, the edge of said interior glass sheet and the edge of said adhesive material sheet being located below the edge of said exterior glass sheet so as to form an interior offset having a width, said glass pane having a line of sight creating, when the glazed unit is considered vertically, a separation between, on the one hand, a hidden part of the glass pane, which is located below said line of sight and which is intended to be hidden inside said door regardless of the position of said glass pane relative to said door and, on the other hand, a visible part of the glass pane, which is located above said line of sight, the method comprising:

for the operation of manufacturing said glass pane by lamination, positioning the edge of said interior glass sheet and the edge of said adhesive material sheet in a lateral projection of the edge of said exterior glass sheet in at least one hidden alignment zone, or in several hidden alignment zones, which is, or are each, located in said hidden part of the glass pane, and are positioned such that after lamination, said interior offset has a width of between 0.8 mm and 5.0 mm, and is present in an entirety of said visible part of the glass pane.

11. The vehicle glazed unit according to claim 1, wherein the interior offset has a width between 1.0 mm and 4.0 mm.

12. The vehicle glazed unit according to claim 11, wherein the interior offset has a width between 1.2 mm and 3.8 mm.

13. The vehicle glazed unit according to claim 2, wherein said interior offset extends, in said hidden part of the glass, over a height of at least 10.0 mm below said line of sight.

14. The vehicle glazed unit according to claim 4, wherein said interior offset has a constant width along an entirety of its length in said visible part of the glass pane.

15. The method according to claim 10, wherein after lamination, said interior offset has a width of between 1.0 mm and 4.0 mm.

16. The method according to claim 15, wherein after lamination, said interior offset has a width of between 1.2 mm and 3.8 mm.

* * * * *